(12) United States Patent
Wunderer et al.

(10) Patent No.: US 12,704,390 B2
(45) Date of Patent: Aug. 11, 2026

(54) OPTICAL FIBER SENSING BASED ON CHANGES IN LASER EMISSION WAVELENGTH

(71) Applicant: PALO ALTO RESEARCH CENTER INCORPORATED, Palo Alto, CA (US)

(72) Inventors: Thomas Wunderer, Santa Cruz, CA (US); Ching-Fuh Lin, Christiansburg, VA (US); Christopher L. Chua, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 487 days.

(21) Appl. No.: 18/078,189

(22) Filed: Dec. 9, 2022

(65) Prior Publication Data

US 2024/0192032 A1 Jun. 13, 2024

(51) Int. Cl.
*G01D 5/353* (2006.01)
*G01K 11/3206* (2021.01)
*G01L 1/24* (2006.01)

(52) U.S. Cl.
CPC ..... *G01D 5/35316* (2013.01); *G01K 11/3206* (2013.01); *G01L 1/246* (2013.01)

(58) Field of Classification Search
CPC . G01D 5/35316; G01K 11/3206; G01L 1/246
See application file for complete search history.

(56) References Cited

U.S. PATENT DOCUMENTS 5,513,913 A * 5/1996 Ball .................. G01D 5/35383 374/161
5,563,732 A * 10/1996 Erdogan ................ H01S 5/146 359/345
6,343,088 B1 * 1/2002 Mugino ................. H01S 5/028 372/49.01
6,347,107 B1 * 2/2002 Roddy .................. H01S 5/028 372/49.01
7,005,630 B2 2/2006 Shin et al.
(Continued)

FOREIGN PATENT DOCUMENTS

CN 107300365 A 10/2017
CN 108592813 A 9/2018
(Continued)

*Primary Examiner* — Michelle M Iacoletti
*Assistant Examiner* — Maher Yazback
(74) *Attorney, Agent, or Firm* — Mueting Raasch Group

(57) ABSTRACT

A sensor includes a light emitter capable of producing stimulated emission. The sensor includes an optical fiber comprising at least one fiber Bragg grating. A first end of the optical fiber is optically coupled to a first emitting end of the light emitter. The fiber Bragg grating is located at a measurement region of the optical fiber away from the first end. A change in wavelength of the laser emission in the optical fiber is induced by a change in peak reflectivity of the fiber Bragg grating. The change in the peak reflectivity occurs in response to an environmental change at the measurement region, e.g., which changes a physical periodicity and/or the refractive index of the grating. The sensor includes an optical detector coupled to the optical fiber or the light emitter that detects the change in the wavelength.

15 Claims, 9 Drawing Sheets

(56) References Cited

U.S. PATENT DOCUMENTS 7,330,271 B2 * 2/2008 Frick ........................ G01K 5/72
356/480
7,418,171 B2 * 8/2008 Grattan ................... G01L 1/242
374/E11.016
9,276,373 B1 * 3/2016 Pang ..................... H01S 3/1062
9,347,826 B2 * 5/2016 Wen ........................ G01L 1/246
9,366,808 B2 * 6/2016 Digonnet ........... G02B 6/02076
9,500,472 B2 11/2016 Ramamurthy et al.
10,247,880 B2 4/2019 Doctor et al.
2002/0054613 A1 * 5/2002 Kang .................... H01S 3/2383
372/6
2003/0035459 A1 * 2/2003 Wilson .................... H01S 5/146
372/97
2005/0105084 A1 * 5/2005 Wang ..................... G01N 21/65
356/301
2005/0276615 A1 * 12/2005 Ranganath ........... H04B 10/505
398/183
2007/0153839 A1 * 7/2007 Varming ............... H01S 3/0675
372/6
2009/0174931 A1 * 7/2009 Huber ................. H01S 3/06791
372/18
2009/0185772 A1 * 7/2009 Xia .................... G01K 11/3206
385/13
2009/0310634 A1 * 12/2009 Mohrdiek ............... H01S 5/141
372/29.022
2013/0193961 A1 * 8/2013 Wen ...................... G01J 1/0425
374/161
2014/0133506 A1 * 5/2014 Wunderer ............. H01S 5/1228
372/45.01
2015/0311669 A1 * 10/2015 Chuang ................ H04B 10/505
398/65
2015/0330848 A1 * 11/2015 Digonnet ............. G02B 6/0208
356/35.5
2017/0025812 A1 * 1/2017 Das ....................... G01J 3/0224
2017/0093118 A1 * 3/2017 Lee ......................... H01S 5/101
2018/0287343 A1 * 10/2018 Morrison .............. H01S 5/1209
2022/0334335 A1 * 10/2022 Chamoun .............. G02B 6/022

FOREIGN PATENT DOCUMENTS

CN 113983943 A 1/2022
WO WO-2013109987 A2 * 7/2013 ......... G01K 11/3206

* cited by examiner 100
101
103
106
EMITTER
DETECTOR
102
104
108
105

OPTICAL FIBER SENSING BASED ON CHANGES IN LASER EMISSION WAVELENGTH

SUMMARY

The present disclosure is directed to a method, system, and apparatus for optical fiber sensing based on change in laser emission wavelength.

In one embodiment a sensor includes a light emitter capable of producing stimulated emission. The sensor includes an optical fiber comprising at least one fiber Bragg grating (FBG). A first end of the optical fiber is optically coupled to a first emitting end of the light emitter. The fiber Bragg grating is located at a measurement region of the optical fiber away from the first end. A change in wavelength of the laser emission in the optical fiber is induced by a change in peak reflectivity of the fiber Bragg grating. The change in the peak reflectivity occurs in response to an environmental change at the measurement region that changes the periodicity and potentially the refractive index of the FBG. The sensor includes an optical detector coupled to the optical fiber or the light emitter. The optical detector detects the change in the wavelength. The change in the wavelength is indicative of the environmental change, e.g., may be mapped to the environmental change via a transfer function, table, etc.

In another embodiment, method involves causing stimulated emission of light from a light emitter into an optical fiber that comprises at least one fiber Bragg grating. The fiber Bragg grating is located at a measurement region of the optical fiber away from the emitter. A change in wavelength of laser emission in the optical fiber is induced by a change in peak reflectivity of the fiber Bragg grating. The change in peak reflectivity occurs in response to an environmental change at the measurement region that changes the periodicity and potentially the refractive index of the FBG. The method further involves detecting the change in the wavelength by an optical detector and measuring the environmental change in response to the change in the wavelength by a monitoring apparatus coupled to the optical detector.

In another embodiment, an apparatus includes a light emitter capable of producing stimulated emission and an optical fiber having at least one fiber Bragg grating. A first end of the optical fiber is optically coupled to a first emitting end of the light emitter. The fiber Brag grating, the light emitter, and the optical fiber together form an external cavity laser that emits at one or more stimulated emission wavelengths. The one or more stimulated emission wavelengths are tunable by strain or refractive index changes affecting the fiber Bragg grating.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figures 1A, 1B:
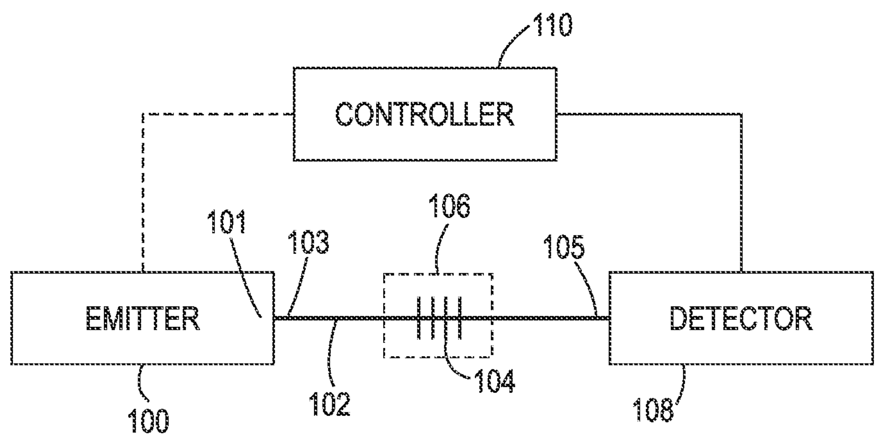
FIGS. 1A, 1B, 1C, and 1D are block diagrams of sensor arrangements according to example embodiments.

The present disclosure is generally related to optical sensing devices and methods. An example of optical sensing are systems that deploy optical fibers to a sensing location. Fiber-optic sensing has been identified and demonstrated as elegant means for remotely detecting environmental conditions (e.g., temperature and strain). This technology has been recently deployed to monitor the structural health and operational condition of large-sized infrastructure (e.g., bridges, wind turbines, etc.). Some advantages of fiber optic sensors in these applications are that optical signals can propagate over long distances in a fiber with low loss. In addition, powering the sensor system can be done at a location far away from the sensing points. Also, the optical signals are generally immune to electromagnetic interference within the fiber.

Embodiments described herein provide the means for a simplified yet powerful fiber-optic sensing system by via a device architecture and operation modality that offers an improvement over existing optical sensing systems. The devices and methods provide significantly enhanced optical signal strength, a simplified optical read-out architecture, and the option to deploy extended wavelength coverage (e.g., sensing at multiple locations). In other embodiments, the same or similar apparatus can be used to tune a stimulated emission wavelength output from the apparatus, which may have other uses besides sensing.

One commonly-used fiber optic sensing and interrogator concept includes three basic components. The first component is a broadband light source, e.g., light emitting (LED) or superluminescent LED (SLED). The light source is optically coupled to the second component, which is an optical fiber with one or more fiber Bragg gratings (FBGs) that is designed to reflect a narrow portion of the source spectrum (e.g., 1 nm). The FBG is sensitive to changes of the environment (e.g., temperature and strain). The physical and optical change of the FBG properties results in a change of the spectral properties of the reflected light which is used as sensor signal. The change in FBG properties may include a physical dimension that increases or reduces periodicity of the grating and/or a change in refractive index (or indices) of the fiber/FBG. The third component is an optical read-out unit that measures the spectral properties of the reflected light. Often, an optical circulator is placed between the light source and the FBG(s) to redirect the reflected photons away from the source towards the read-out unit.

In this type of fiber optic sensing and interrogator, back-reflected photons from a spontaneous emission light source at the FBG is used as the optical signal. Only a very small fraction of the light source intensity can actually be used as the optical signal (most of it is lost through transmission and weak coupling between the LED and the optical fiber). In embodiments described below, higher intensity, narrow linewidth laser emission (e.g., stimulated emission) are used as the optical signal. In one embodiment, a narrow linewidth laser signal is produced by laser self-injection locking of a Fabry-Perot laser (or gain element) that is coupled to the FBG (or FBG array). Back-reflected photons from the FBG "force" the laser emission to collapse into only one longitudinal, narrow linewidth mode (per FBG).

In embodiments that use a Fabry-Perot laser as a light source, changes to the FBG due to changes of the environment may be observed as mode hopping events in which the laser signal experiences discrete shifts in the observed spectrum, e.g., selection of specific Fabry-Perot modes. In embodiments where continuous wavelength tuning (without mode hopping) is desired the light source may comprise a semiconductor optical amplifier (SOA) or reflective semiconductor optical amplifier (RSOA). The (R)SOA in combination with the fiber and FBG form an extended cavity laser that experiences a continuous shift in spectral properties (e.g., lasing wavelength) in response to changes to the FBG. In these examples, the extended-cavity laser itself can be regarded as light source and optical signal provider. In these embodiments, the optical signal can be easily read out (e.g., without the need of a circulator) on either or both sides of the extended device (e.g., at a second laser facet, at an end of the fiber opposite the light source, etc.) due to the relatively high optical power level of the light within the waveguide.

In FIG. 1A, a block diagram shows a sensor arrangement according to an example embodiment. The sensor arrangement includes a light emitter 100 capable of producing stimulated emission and an optical fiber 102 comprising at least one fiber Bragg grating 104. A first end 103 of the optical fiber 102 is optically coupled to a first emitting end 101 of the light emitter 100. The fiber Bragg grating is located at a measurement region 106 of the optical fiber away from the first end 103. A change in wavelength of laser emission in the optical fiber 102 is induced by a change in reflectivity of the fiber Bragg grating 104. The change in the reflectivity occurs in response to an environmental change at the measurement region 106 that changes the refractive index of the FBG. An optical detector (e.g., spectrometer) 108 is coupled to the optical fiber 102. The optical detector 108 detects the change in the wavelength and determines the environmental change in response thereto. In this example, the detector is coupled to second end 105 of the optical fiber 102 opposite the first end 103. In other embodiments, the detector 108 could be coupled to another part of the fiber 102 or coupled to the light emitter 100.

In one or more embodiments, the light emitter 100 may include a laser diode (e.g., a Fabry-Perot laser diode) having multiple longitudinal modes. The change in the wavelength comprises a discrete change in the wavelength due to mode hopping. In one or more other embodiments, the light emitter 100 may include a laser gain medium with a low reflectivity facet as the light source, e.g., a (reflective) semiconductor optical amplifier, (R)SOA, that forms an external cavity laser with the optical fiber 102 and the fiber Bragg grating 104.

The sensor arrangement may include or be coupled to a monitoring apparatus such as controller 110, e.g., an electronic circuit suitable to process signals generated by the sensor arrangement. The controller 110 is at least coupled to the detector 108 in order to gather and/or process optical measurements in the fiber 102. As indicated by the dotted line between the emitter 100 and the controller 110, the controller 110 may also provide inputs to the emitter 100, e.g., to provide power, monitor sensors on the emitter 100, etc. For example, the controller 110 may change an output power of the emitter 100 to compensate for temperature changes, aging of the emitter 100 and/or fiber 102, etc. In one or more other embodiments, the emitter 100 may be electrically isolated from the detector 108 and controller 110, e.g., having its own power source and/or control circuits.

In some installations, the emitter 100 and detector 108 may be physically separated, e.g., at either end of a bridge or other large object. In such a case, there may not be direct wired connections between the emitter 100, detector 108, and controller 110 as this would involve long runs of wires along with the fiber 102. However, the emitter 100 and detector 108 could still be coupled to a common controller 110, e.g., via wireless links, via modulation of the optical signal within in the fiber 102, etc.

In other embodiments, there may be advantages in having the emitter 100 and detector 108 physically proximate one another, e.g., in a common enclosure. The nature of the fiber makes this possible, as seen in FIG. 1B for example. In this figure, the fiber is looped between co-located or physically proximate emitter 100 and detector 108. This may simplify installation and electrical coupling of the electrical components, although would use a longer fiber 102 compared to the arrangement shown in FIG. 1A, increasing fiber costs as well as increasing optical losses in the fiber 102. Note that in the fiber-optical communication band, the fiber loss is very small, so increasing the fiber length does not cause a significant problem with losses.

Figure 1C:
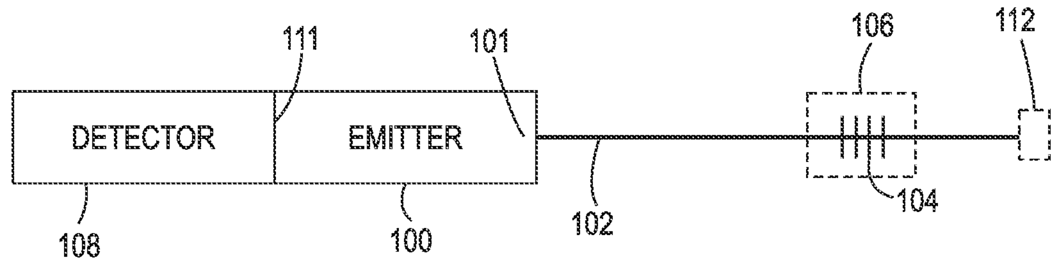

In FIG. 1C, a block diagram shows a sensor arrangement according to another example embodiment. In this example, the detector 108 is located at an end or side 111 of the emitter 100 that is opposed to the optical fiber 102. The light emitter 100 may have two facets at the ends 101, 111 (two laser mirrors in case of Fabry-Perot, or one anti-reflection coated facet and one mirror in case of RSOA) to couple light out. The fiber Bragg grating 104 within the optical fiber 102 could be a reflector for end 101 of the emitter 100, and/or a separate reflector 112 at a distal end of the optical fiber 102 could act as a reflector for end 101. A second reflector could also be placed at end 111 of the emitter 100. Even if the second reflector had a high reflectivity of e.g., 99%, 1% of the laser light would still be emitted from end 111. Thus, the detector/spectrometer 108 could also be placed to receive light transmitted through a reflector on end 111. This allows physically co-locating the emitter 100 and detector 108 without an extended fiber as shown in the embodiment of FIG. 1B.

Figure 1D:
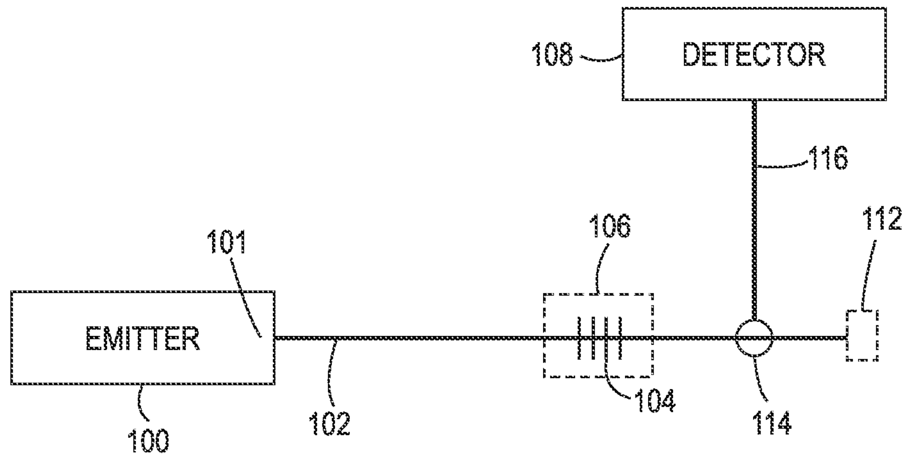

In FIG. 1D, a block diagram shows a sensor arrangement according to another example embodiment. In this example, the detector 108 is coupled to the optical fiber 102 via a coupler 114 (e.g., a splitter or evanescent coupler). The light from the coupler 114 may be directed to the detector 108 via a fiber or waveguide 116. The coupler 114 may be located elsewhere along the optical fiber 102, e.g., between the fiber Bragg grating 104 and the emitter 100, at end 111 of the emitter shown in FIG. 1C, etc.

Note that the embodiments shown in FIGS. 1A-1D (as well as FIG. 5 described below) may be used in an apparatus that is not generally used as a sensor. The light emitted from the emitter 100 may be used for some other purpose, e.g., communication, heating, providing power, measurement, etc. In such a case, the stimulated emission wavelength of the emitted light may be tuned by physical manipulation (e.g., heating, bending, stretching) of the fiber Bragg grating 104 (or multiple gratings 504 in FIG. 5). In such an application, the detector 108 shown in the figures may be substituted with an optical target device that receives the tunable light used for the above listed applications. The detector 108 may also be included together with the optical target device, e.g., to monitor system state.

Figure 2:
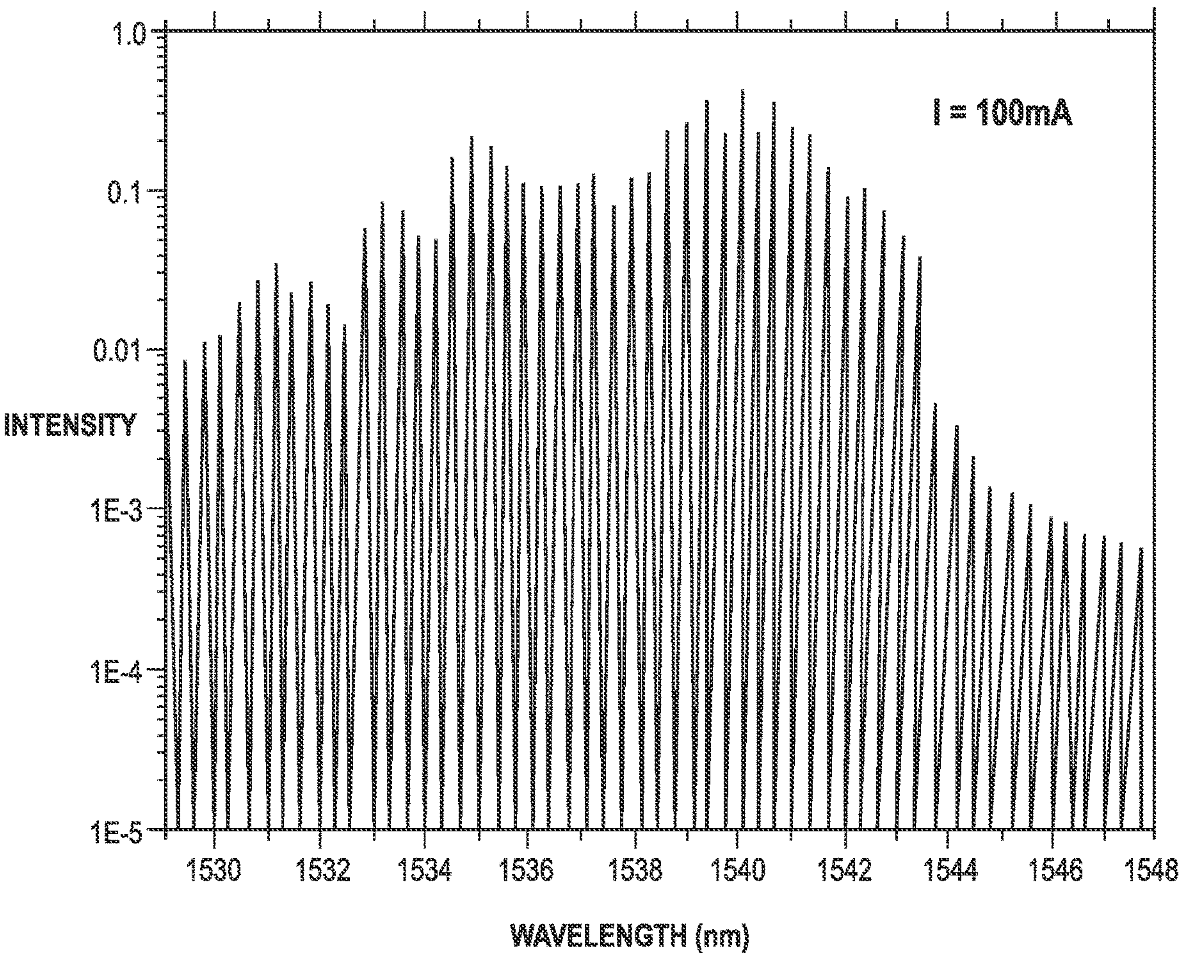
FIGS. 2-4 are graphs showing optical characteristics of a sensor according to example embodiments.
Figure 3:
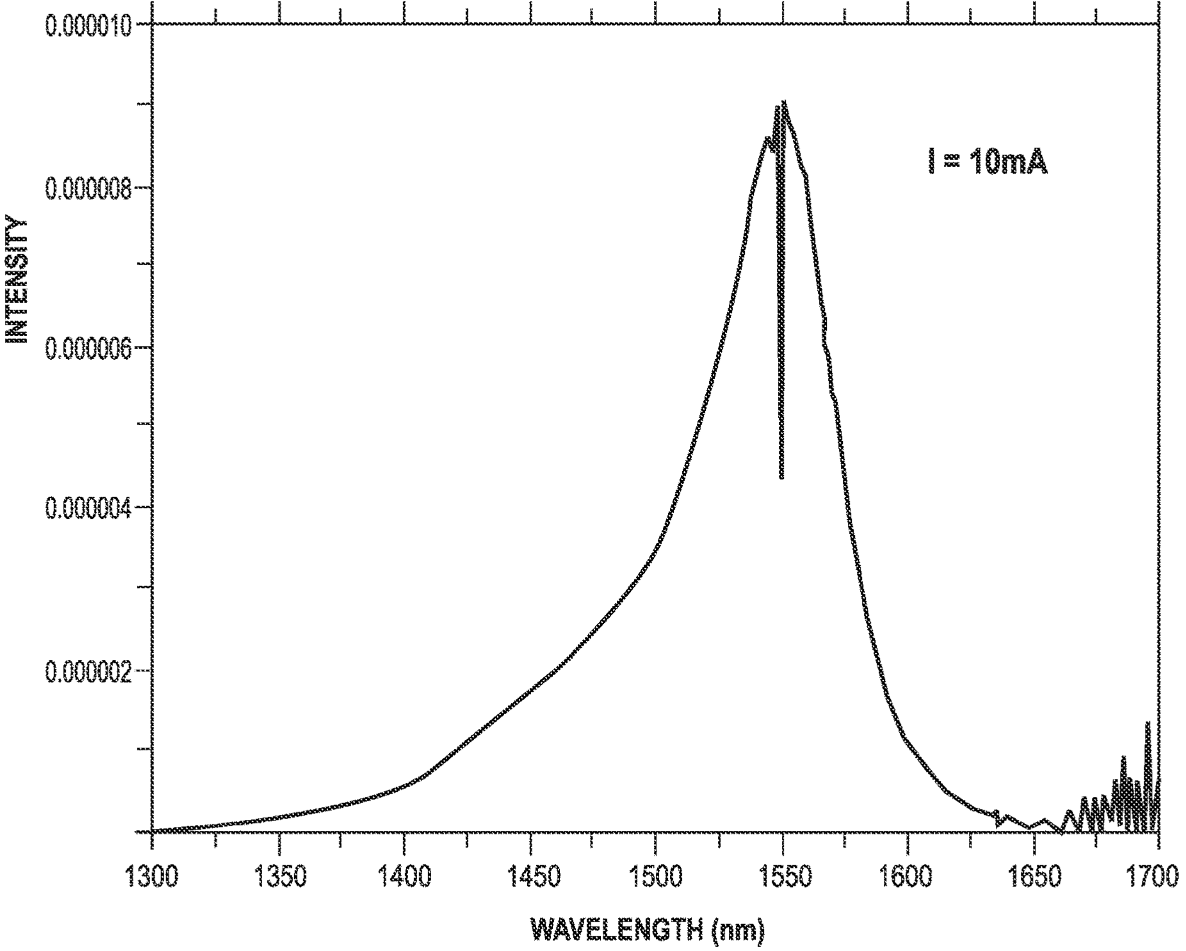
Figure 4:
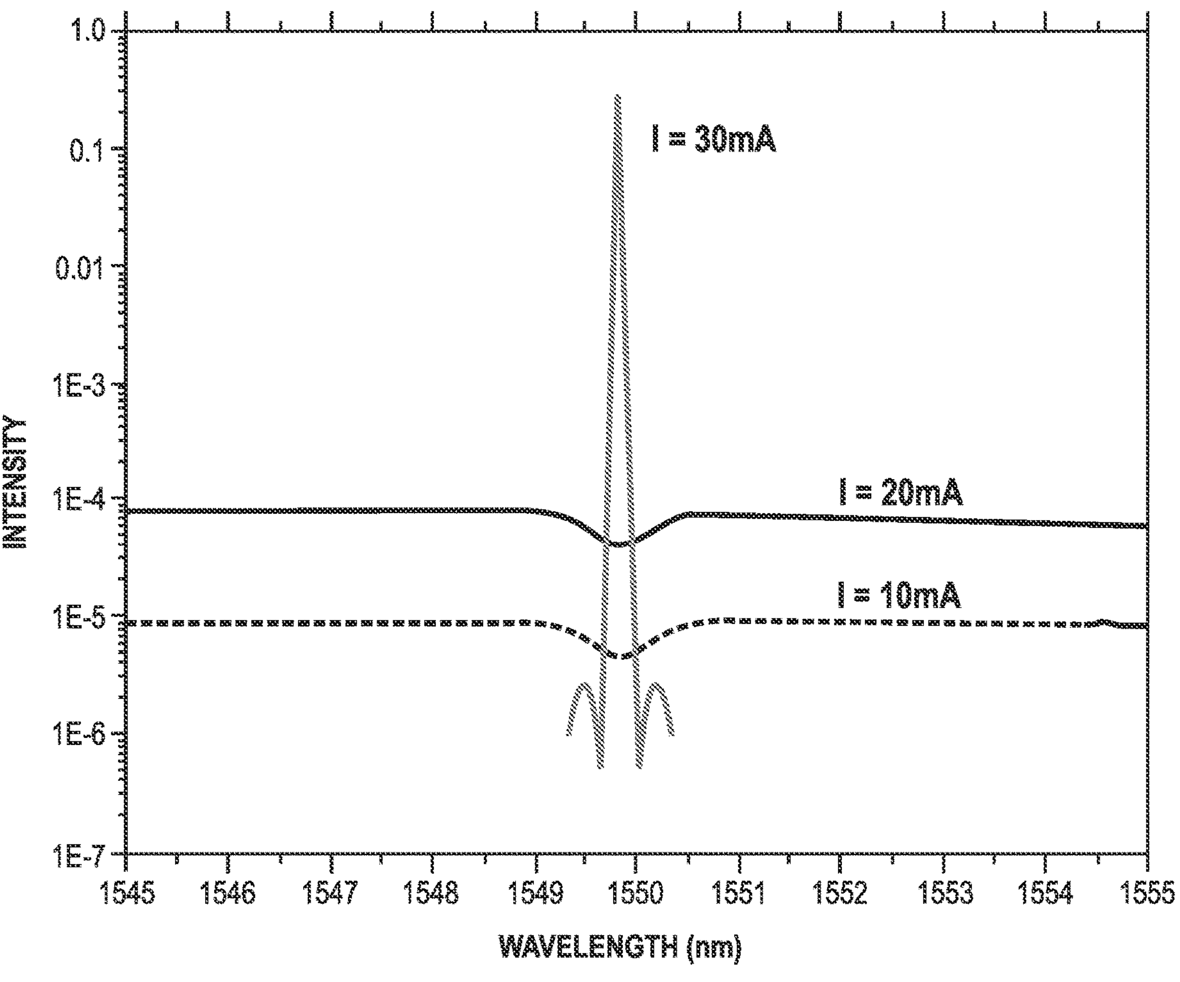

In FIG. 2, a plot shows the laser spectrum of a Fabry-Perot laser diode that may be used as a light emitter in various embodiments. The peaks in the intensity curve indicate multiple longitudinal modes with a spacing of ~0.3 nm. In FIG. 3, a plot shows an optical spectrum of a Fabry-Perot laser diode coupled to a FBG fiber and recorded in transmission. In this case, the laser diode is operated below the laser threshold (low drive current of 10 mA) and only spontaneous emission is seen. The dip in the transmission spectrum at ~1550 nm is caused by the FBG reflection. In FIG. 4, a plot shows an optical spectrum of the same laser and fiber configuration at higher drive currents. When the current is above the laser threshold (e.g., 30 mA), only one longitudinal laser mode occurs (e.g., compared to FIG. 2), at the same wavelength (here: 1550 nm) of the peak/dip of the caused by the FBG below the lasing threshold. The useful optical signal intensity is increased by multiple orders of magnitude.

Figure 5:
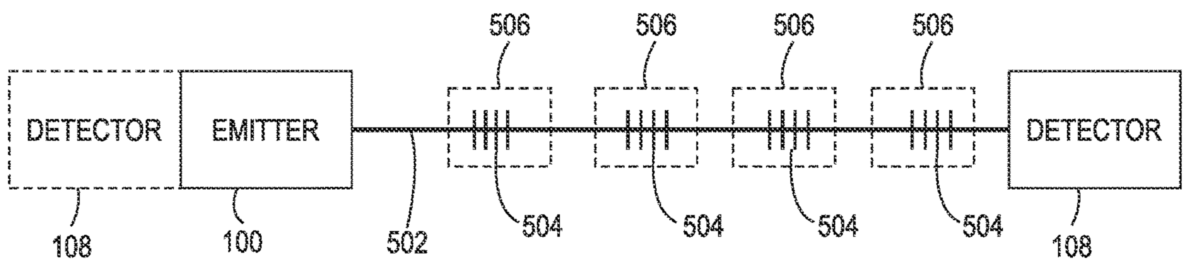
FIG. 5 is a block diagram of a sensor arrangement according to another example embodiment.
Figure 6:
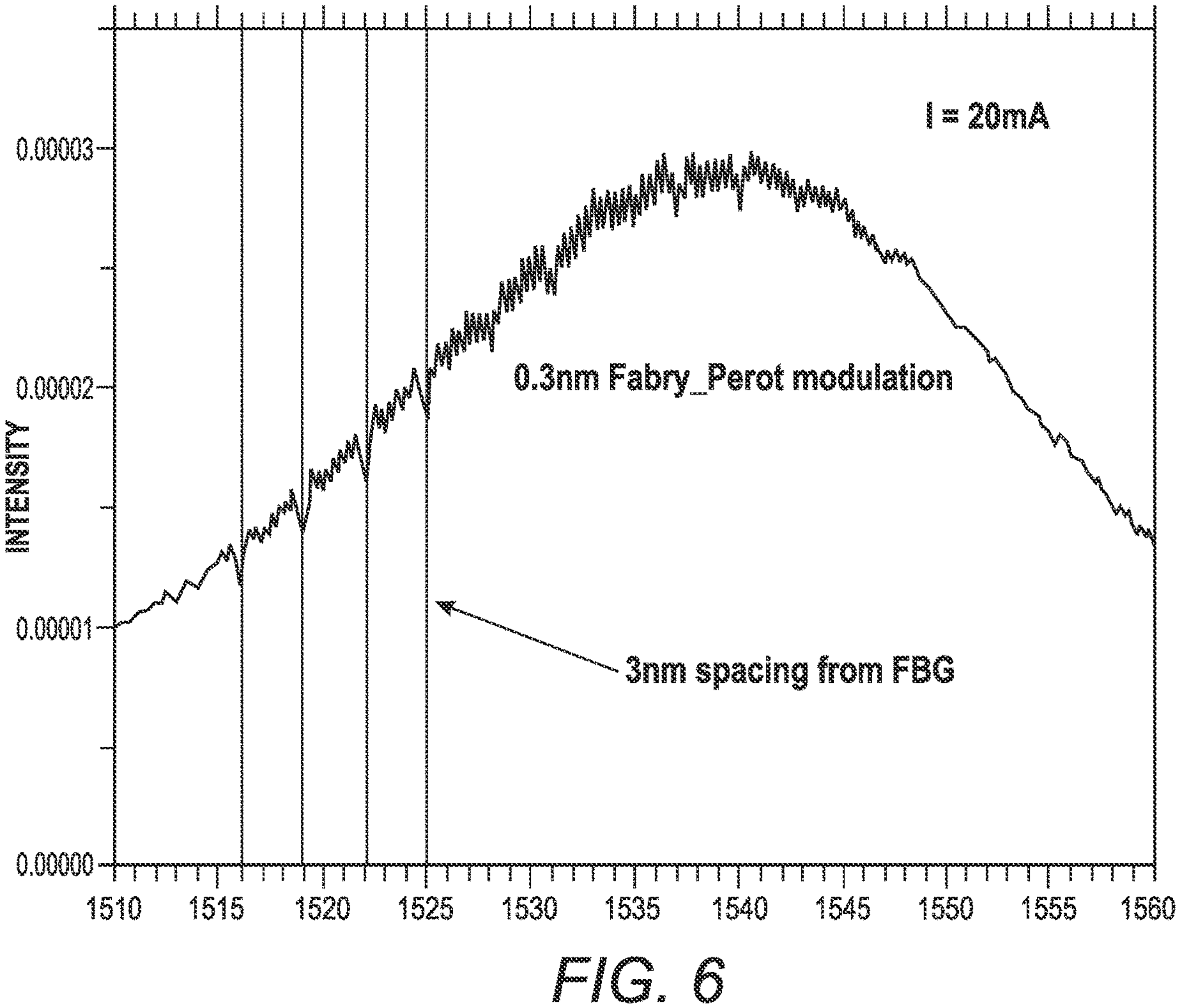
FIGS. 6 and 7 are graphs showing optical characteristics of a sensor according to example embodiments of the sensor FIG. 5.
Figure 7:
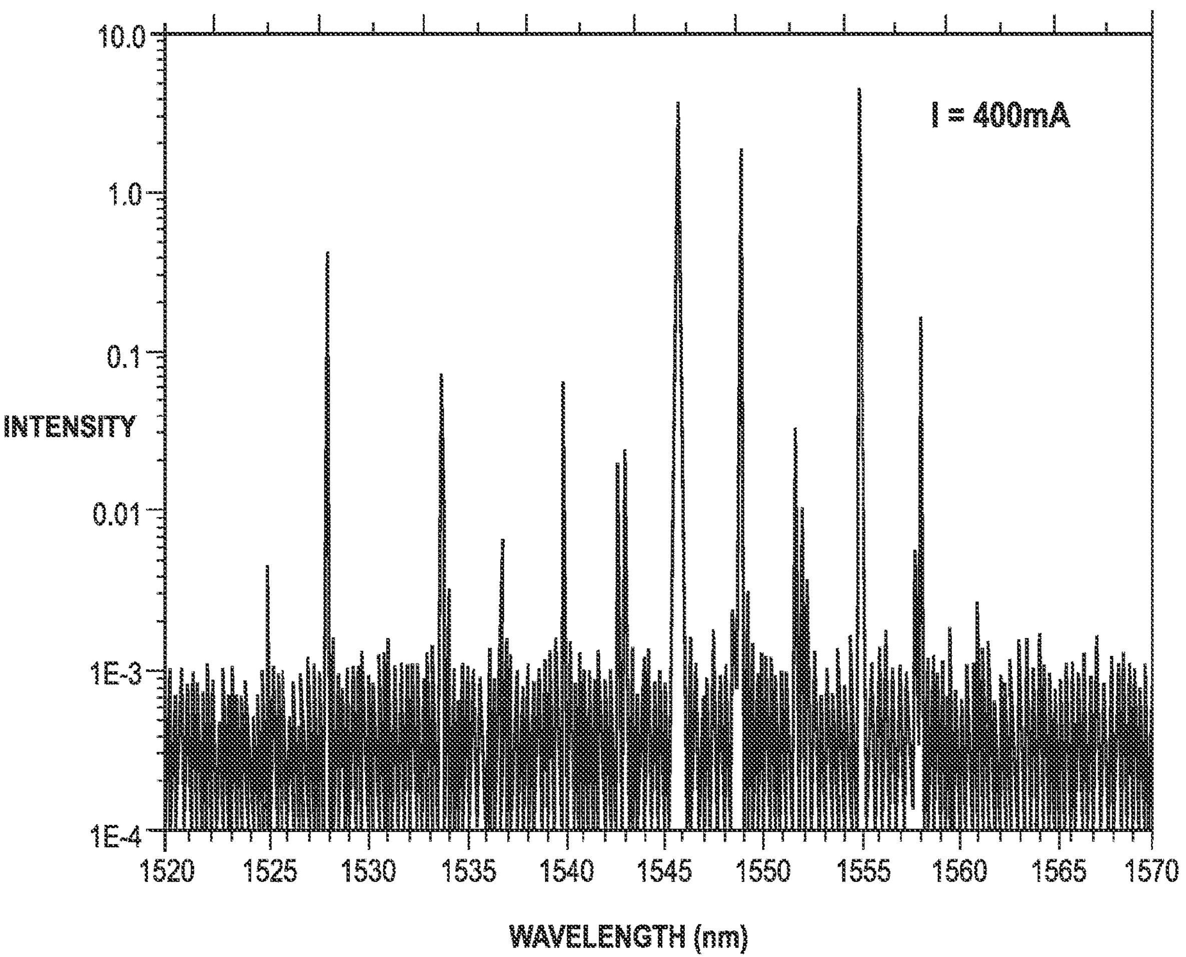

In FIG. 5, a diagram shows a sensor arrangement according to one or more example embodiments. This figure uses similarly labeled components as in FIG. 1, except that optical fiber 502 has two or more fiber Bragg gratings 504 spaced longitudinally apart along respective two or more measurement regions 506. This arrangement could optionally use detector 108*a* coupled to an end of the emitter 100 opposite the optical fiber 502 instead of or in addition to detector 108 which is at an end of the fiber 502. Each of the fiber Bragg gratings 504 are tuned to affect a different wavelength of the laser emission. For example, as shown in the plot of FIG. 6, each fiber Bragg grating 504 may affect wavelengths offset from each other by a constant spacing, e.g., 3 nm. In this plot, the input current (20 mA) is too low to induce lasing, and so reflections from the fiber Bragg gratings cause dips in the transmission spectrum. In FIG. 7, a plot shows intensity of a multiple grating configuration where the current is significantly above the laser threshold (e.g., 400 mA). As seen in this figure, multiple laser emission lines develop, all related to the individual peak reflectivities of the fiber Bragg grating array.

Variations in properties of the individual fiber Bragg gratings in the array can be used as sensor signal for multiple measurement regions, e.g., regions that are separated in space along the fiber. In other embodiments, two or more FBGs may be proximate to each other but tuned to different wavelengths and potentially to react differently to different stimuli. For example, a part of the fiber near one FBG may be fastened to a structure to measure strain, and a nearby FBG on the same fiber may be mechanically uncoupled from the structure in order to measure temperature in the same general location.

Figure 8:
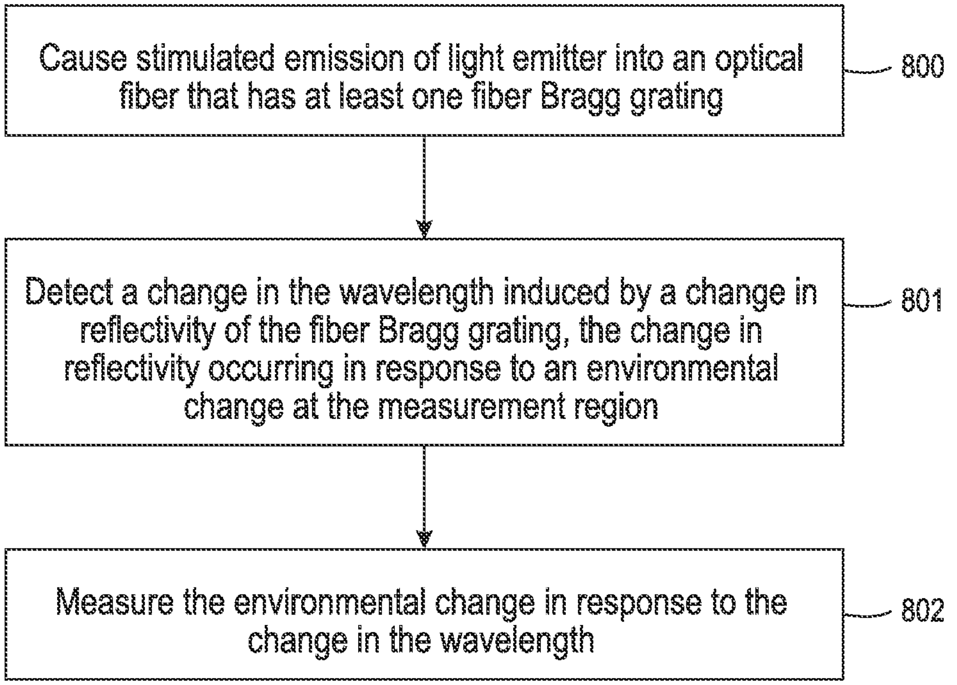
FIG. 8 is a flowchart of a method according to an example embodiment.

In FIG. 8, a flowchart shows a method according to an example embodiment. The method involves causing stimulated emission 800 of light from a light emitter into an optical fiber that has or includes at least one fiber Bragg grating. The fiber Bragg grating is located at a measurement region of the optical fiber away from the emitter. A change in wavelength of laser emission in the optical fiber is induced by a change in reflectivity of the fiber Bragg grating. The change in reflectivity occurs in response to an environmental change at the measurement region, e.g., as the periodicity and potentially refractive index of the FBG changes. The change in the wavelength is detected 801 by an optical detector, and the environmental change is measured 802 in response to the change in the wavelength, e.g., by a monitoring apparatus coupled to the optical detector.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a hardware processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality.

Terms related to orientation, such as "top," "bottom," "side," and "end," are used to describe relative positions of components (e.g., as arranged in the figures) and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiment.

References to a "combination" of different elements is also meant to include each element on its own unless otherwise indicated. For example, a combination of A, B, and C may include any one of A, B, or C alone, as well as A+B, A+C, A+B+C, etc. Further, where the elements of the combinations are actions (e.g., steps of a method), the listing of actions is not meant to imply a specific order that the actions may be taken in the combination unless otherwise indicated.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A sensor comprising:

a light emitter capable of producing stimulated emission, the light emitter comprising a laser diode having multiple longitudinal modes;

an optical fiber comprising at least one fiber Bragg grating, a first end of the optical fiber optically coupled to a first emitting end of the light emitter, the fiber Bragg grating located at a measurement region of the optical fiber away from the first end, a change in wavelength of the laser emission in the optical fiber being induced by a change in peak reflectivity of the fiber Bragg grating, the change in the peak reflectivity occurring in response to an environmental change at the measurement region; and an optical detector coupled to the optical fiber or the light emitter, the optical detector detecting the change in the wavelength wherein the change in the wavelength comprises a discrete change in the wavelength due to mode hopping, the change in the wavelength indicative of the environmental change.

2. The sensor of claim 1, wherein the laser diode comprises a Fabry-Perot laser diode.

3. The sensor of claim 1, wherein the first emitting end of the light emitter has an optical reflectivity of less than 5%.

4. The sensor of claim 3, wherein the light emitter comprises a semiconductor optical amplifier or reflective semiconductor optical amplifier.

5. The sensor of claim 3, wherein the change in the wavelength of the laser emission is continuous.

6. The sensor of claim 1, wherein the optical detector is coupled to a second end of the optical fiber opposite the first end of the optical fiber.

7. The sensor of claim 1, wherein the optical detector is coupled to a second emitting end of the light emitter opposite the first emitting end of the light emitter.

8. The sensor of claim 1, wherein the environmental change comprises at least one of a change in temperature of the optical fiber and a change in strain of the optical fiber.

9. The sensor of claim 1, wherein the at least one fiber Bragg grating comprises two or more fiber Bragg gratings, each of the two or more fiber Bragg gratings longitudinally spaced apart in the optical fiber along respective two or more measurement regions, each of the two or more fiber Bragg gratings tuned to affect a different wavelength of the laser emission.

10. The sensor of claim 9, wherein changes in the different wavelengths are used by the optical detector to respectively determine environmental changes at the two or more measurement regions.

11. The sensor of claim 1, wherein the light emitter and the optical detector are physically co-located.

12. The sensor of claim 1, wherein the optical detector is coupled to the optical fiber between the first end of the optical fiber and a second end of the optical fiber opposite to the first end of the optical fiber.

13. A method comprising:

causing stimulated emission of light from a light emitter into an optical fiber that comprises at least one fiber Bragg grating, the light emitter comprising a laser diode having multiple longitudinal modes, the fiber Bragg grating located at a measurement region of the optical fiber away from the emitter, a change in wavelength of laser emission in the optical fiber being induced by a change in peak reflectivity of the fiber Bragg grating, the change in peak reflectivity occurring in response to an environmental change at the measurement region;

detecting the change in the wavelength by an optical detector, wherein the change in the wavelength comprises a discrete change in the wavelength due to mode hopping; and measuring the environmental change in response to the change in the wavelength by a monitoring apparatus coupled to the optical detector.

14. The method of claim 13, wherein the environmental change comprises at least one of a change in temperature of the optical fiber and a change in strain of the optical fiber.

15. The method of claim 13, wherein the at least one fiber Bragg grating comprises two or more fiber Bragg gratings, each of the two or more fiber Bragg gratings longitudinally spaced apart in the optical fiber along respective two or more measurement regions, each of the two or more fiber Bragg gratings tuned to affect a different wavelength of the laser emission, and wherein changes in the different wavelengths are detected by the optical detector and used by the monitoring apparatus to respectively determine environmental changes at the two or more measurement regions.

* * * * *